(12) United States Patent
Morimura et al.

(10) Patent No.: US 7,724,779 B2
(45) Date of Patent: May 25, 2010

(54) TRANSMISSION SYSTEM AND CONTROL METHOD

(75) Inventors: Kazuhiko Morimura, Tokyo (JP); Kenichi Morikawa, Kawasaki (JP); Jun Kawashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 670 days.

(21) Appl. No.: 11/386,724

(22) Filed: Mar. 23, 2006

(65) Prior Publication Data

US 2006/0251129 A1 Nov. 9, 2006

(30) Foreign Application Priority Data

Mar. 30, 2005 (JP) ............... 2005-099543

(51) Int. Cl.
*H04J 3/06* (2006.01)
(52) U.S. Cl. .............. 370/509; 370/503; 370/510
(58) Field of Classification Search .......... 370/503, 370/509, 510, 392, 535, 536, 537, 401, 474
See application file for complete search history.

(56) References Cited

U.S. PATENT DOCUMENTS

| | | | | |
|---|---|---|---|---|
| 6,490,248 | B1 * | 12/2002 | Shimojo | 370/229 |
| 6,697,382 | B1 * | 2/2004 | Eatherton | 370/503 |
| 6,744,772 | B1 | 6/2004 | Eneboe | |
| 6,813,282 | B1 | 11/2004 | Domon | |
| 6,868,097 | B1 * | 3/2005 | Soda et al. | 370/537 |
| 6,909,728 | B1 * | 6/2005 | Kuribayashi et al. | 370/518 |
| 7,372,873 | B1 * | 5/2008 | Kumar et al. | 370/484 |
| 7,447,237 | B2 | 11/2008 | Koshino et al. | |
| 2001/0006525 | A1 | 7/2001 | Mizuguchi | |
| 2001/0014088 | A1 * | 8/2001 | Johnson et al. | 370/338 |
| 2002/0071438 | A1 * | 6/2002 | Singh | 370/398 |

FOREIGN PATENT DOCUMENTS

| | | |
|---|---|---|
| EP | 1 087 581 | 3/2001 |
| JP | 2001-94576 | 4/2001 |
| JP | 2001-177570 | 6/2001 |
| JP | 2004-186877 | 7/2004 |
| WO | 02/01785 | 1/2002 |

OTHER PUBLICATIONS http://www.ietf.org/rfc/rfc1889.txt?number=1889.
http://www.ietf.org/rfc/rfc1890.txt?number=1890.
http://www.ietf.org/rfc/rfc2205.txt?number=2205.
http://standards.ieee.org/regauth/ethertype/type-pub.html.
http://grouper.ieee.org/groups/802/3/re_study/index.html.
http://www.ieee802.org/1/pages/avdbridges.html.
Japanese Official Action dated Feb. 2, 2010 issued in counterpart Japanese Application No. 2005-099543.

* cited by examiner

*Primary Examiner*—Dang T Ton
*Assistant Examiner*—Kevin Lee
(74) *Attorney, Agent, or Firm*—Fitzpatrick, Cella, Harper & Scinto

(57) ABSTRACT

This invention provides a transmission system and control method capable of reliably transmitting real-time data. A switching device and router each serving as an intermediate device mediate an iso-data packet sent from each iso-data server to a predetermined terminal at a timing designated by an iso-packet from the iso-server. If a plurality of iso-data packets conflict in the transmission path, the switching device and router collectively continuously output the plurality of iso-data packets.

7 Claims, 12 Drawing Sheets

FIG. 8

| V | P | X | CC | M | PT | Sequence No. |
|---|---|---|----|----|----|---|
| Time Stamp ||||||||
| SSRC Identifier ||||||||
| CCRC Identifier ||||||||
| Payload ||||||||

V : Version Number
P : Padding Bit
X : Extension Bit
CC : CSRC Count
M : Marker Bit
PT : Payload Type

TRANSMISSION SYSTEM AND CONTROL METHOD

FIELD OF THE INVENTION

The present invention relates to a transmission system and a control method and, more particularly, to a transmission control technique for real-time data transmission.

BACKGROUND OF THE INVENTION

Conventionally, RTP (Real Time Protocol) is widely used as a protocol in real-time data transmission such as streaming (IETF standard RFC1889 Internet: http://www.ietf.org/rfc/rfc1889.txt?number=1889, IETF standard RFC1889 Internet: http://www.ietf.org/rfc/rfc1890.txt?number=1890).

The RTP has a protocol to transmit a payload serving as a data main body and a protocol (RTCP: RTP Control Protocol) to control transmission of the payload. As the protocol to transmit a payload itself, UDP (User Datagram Protocol)/IP (Internet Protocol) is used, which does not send a packet arrival confirmation response and neglects a nonarrival packet. On the other hand, the RTCP is implemented on TCP/IP to monitor negotiation of transmission media and QoS (Quality of Service) and control the start/end of a session.

The RTP assumes a translator which converts a given RTP packet format and a mixer which integrates a plurality of RTP packet formats into one format. Hence, a format shown in FIG. 8 is used as an RTP packet format. The SSRC (Synchronization Source) Identifier of the format shown in FIG. 8 is a synchronous transmission source identifier indicating the transmission source of an RTP packet. The CSRC (Contribution Source) Identifier is a contribution transmission source identifier indicating a list of transmission sources which have contributed to transmission of the RTP packet. If the packet is transmitted via a translator, a translator identifier is added to the CSRC identifier. If the packet is transmitted via a mixer, a preceding SSRC identifier is added to the CSRC identifier, and the identifier of the mixer changes to a new SSRC identifier.

The sequence number is a serial number assigned to the payload of the RTP packet. The sequence number is monotonously incremented by "1" every time an RTP packet is transmitted. The time stamp indicates the time of RTP packet transmission. This time is not the actual transmission time of the RTP packet but a time relative to the transmission time of another RTP packet. The time is given by 32 bits.

An RTP packet with this format is basically downloaded from the transmission source to the transmission destination by using the UDP (User Datagram Protocol). The receiving side determines the download situations (communication state and channel state) on the basis of, e.g., the above-described sequence number and time stamp by using the RTCP and reports the situations to the transmission source periodically. The transmitting side executes transmission control by, e.g., adjusting the quality of the payload on the basis of the channel state report.

The outline of transmission control by the RTCP/RTP will be described on the basis of FIG. 9. Referring to FIG. 9, the client (receiving side) transmits an [OPTIONS] command to the server (transmitting side), thereby exchanging device information with each other. The server notifies the client of information about a transmission content by a [DESCRIBE] command. The client determines the content transmission method on the basis of the received information and notifies the server of the transmission method by a [SETUP] command. The client transmits a [PLAY] command to the server, thereby requesting the server to transmit the content.

The series of communications are executed without loss of information by using the RTCP implemented on the TCP/IP. More specifically, since the TCP/IP is used, if a packet is lost on the transmission channel, the packet loss state is recognized by the TCP/IP so that the packet is resent.

Next, contents (RTP packets) are continuously transmitted from the server to the client by using the RTP. The RTP used for this transmission is implemented on the UDP/IP. For this reason, even when an RTP packet is lost, the RTP packets are continuously transmitted without resending the lost packet.

Finally, when a [TEARDOWN] command in the RTCP is transmitted from the client to the server, the server stops transmitting RTP packets. The client detects an RTP packet loss or the like on the basis of the RTCP. If an RTP packet loss or the like is detected, the client transmits a [RESEND] command of the RTCP to the server after the end of continuous RTP packet reception based on the UDP, thereby requesting resending of the lost RTP packet.

In such transmission using the RTCP or RTP, no control to ensure a channel band necessary for data transmission is executed. In RFC2205 (IETF standard RFC2205 Internet: http://www.ietf.org/rfc/rfc2205.txt?number=2205), a band control protocol RSVP (Resource Reservation Protocol) has been developed. In the RSVP, a resource, i.e., channel band is reserved for a series of streaming data.

FIG. 10 shows the arrangement of a host and a router used when a channel band is reserved by the RSVP. In the host shown in FIG. 10, an application claims the priority for an RSVP Process. If the claim of priority is authenticated by an Admission Control, and a Policy Control executes policy control, a packet classifier appends a classification parameter with high priority to a real-time stream generated from the application. A packet scheduler reserves a band preferentially for a packet of the real-time stream generated from the application.

This process is executed for a series of routers on the transmission path of host→router→ . . . →router→host, thereby ensuring the resource. As described above, in the RSVP, QoS is set for the host-to-host transmission path to ensure the band.

In the conventional transmission method, however, it may be impossible to reliably transmit streaming data (real-time data) such as image or audio data because of the influence of, e.g., a transmission delay, fluctuation, or packet loss that occurs in an intermediate device such as a switch or router in the network.

SUMMARY OF THE INVENTION

The present invention has been made in consideration of the above-described situation, and has as its object to provide a transmission system and control method capable of reliably transmitting real-time data.

In order to achieve the above object, according to the present invention, there is provided a transmission system having a synchronization control server which supplies, to a data output server at a predetermined time interval, a synchronization control packet to designate a transmission timing in transmitting an isochronous data packet from the data output server to a terminal device, and an intermediate device which mediates transmission of the isochronous data packet and the synchronization control packet, the intermediate device comprising output control means for, when a plurality of isochronous data packets conflict in a transmission path of the isochronous data packet, collectively continuously outputting the plurality of isochronous data packets.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a view showing the format of a conventional RTP packet;

DETAILED DESCRIPTION OF THE PREFERRED EMBODIMENT

An embodiment of the present invention will be described below in detail with reference to the accompanying drawing. The constituent elements described in the embodiment are merely examples and do not limit the scope of the present invention.

Figure 2:
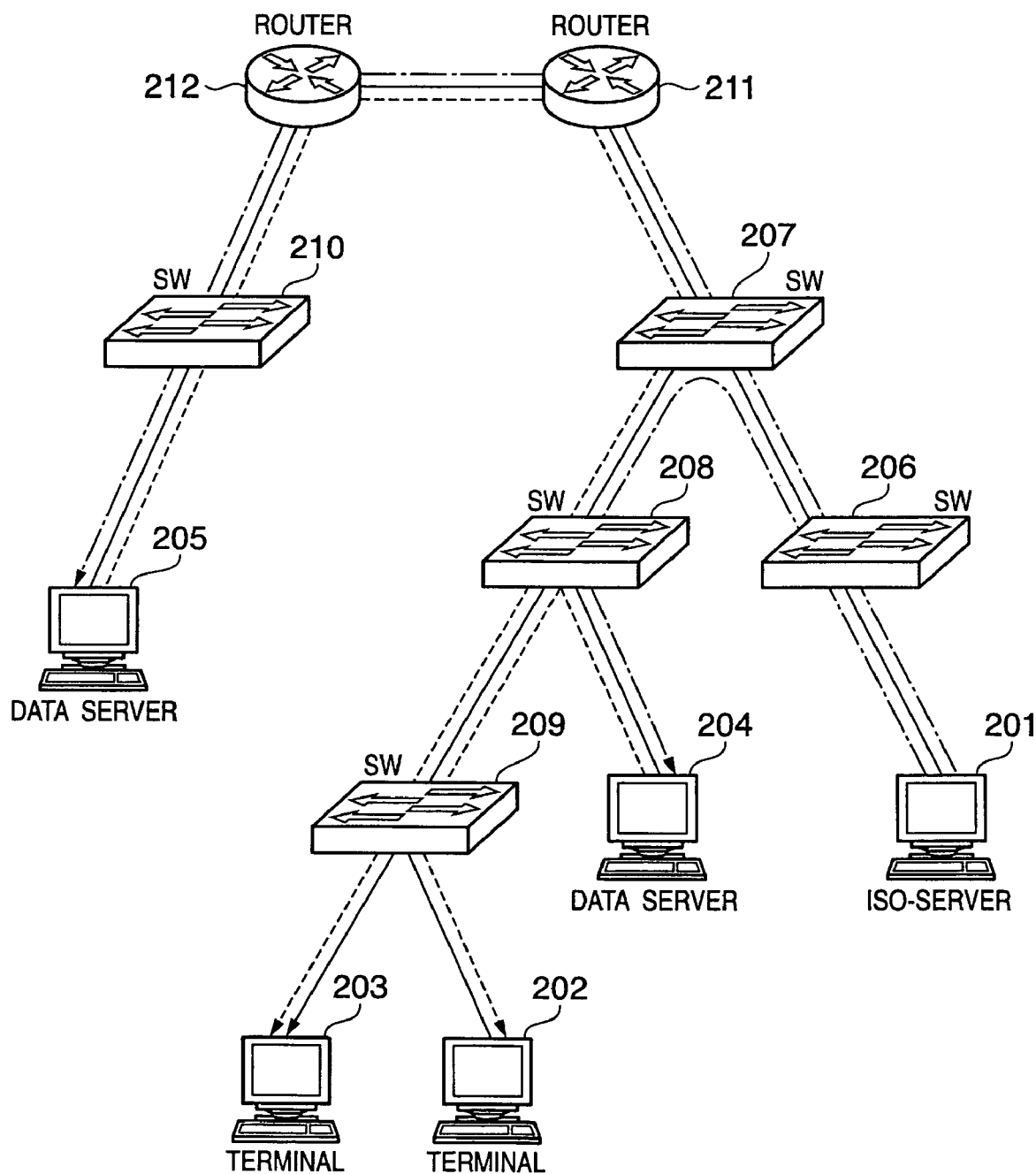
FIG. 2 is a view showing a configuration example of a network using a transmission system according to the embodiment of the present invention.

FIG. 2 is a view showing configuration example of a network using a transmission system according to the embodiment of the present invention. An iso-server 201, data servers 204 and 205, terminals 202 and 203, switching devices 206 to 210, and routers 211 and 212 are connected to the network.

The iso-server 201 transmits, to the data servers 204 and 205 at a predetermined time interval, a packet (to be referred to as an iso-packet hereinafter) to designate the transmission timing in layer 3 or a frame (to be referred to as an iso-frame hereinafter) to designate the transmission timing in layer 2 to guarantee synchronous transmission of isochronous data (real-time data) such as video or audio data by the data servers 204 an 205 (alternate long and short dashed line in FIG. 2). The iso-server 201 functions as a synchronization control server.

Figure 6:
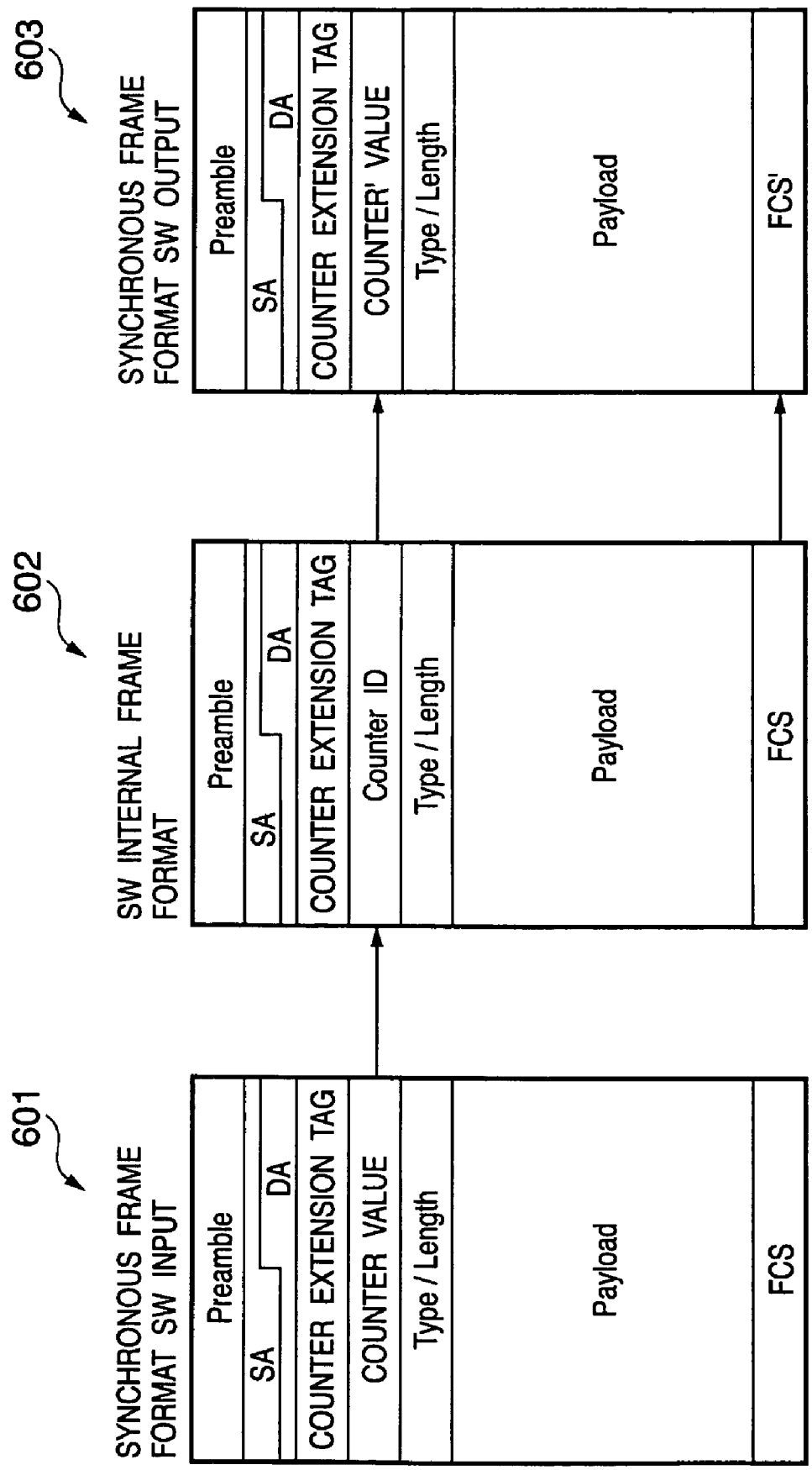
FIG. 6 is a view showing the frame format of layer 2 of an iso-frame used in the embodiment of the present invention.

The frame format in the MAC layer of the iso-packet is indicated by 601 in FIG. 6. The packet format in the IP layer is shown in FIG. 7B or 7C. The packet formats will be described later in detail. As the biggest characteristic feature, the transmission timing is designated by a counter value.

The data servers 204 and 205 transmit isochronous data to the terminals 202 and 203 at a predetermined period on the basis of the counter value in an iso-packet or iso-frame transmitted from the iso-server 201 at a predetermined time interval (period) (broken line in FIG. 2). In this specification, a packet or frame having isochronous data as a payload is called an iso-packet in layer 3 and iso-frame in layer 2.

The switching devices 206 to 210 connect the stations in the same network and switch the transmission path on the basis of the information of the MAC layer. The routers 211 and 212 connect networks to each other and switch the transmission path on the basis of the information of the IP layer.

Figure 3:
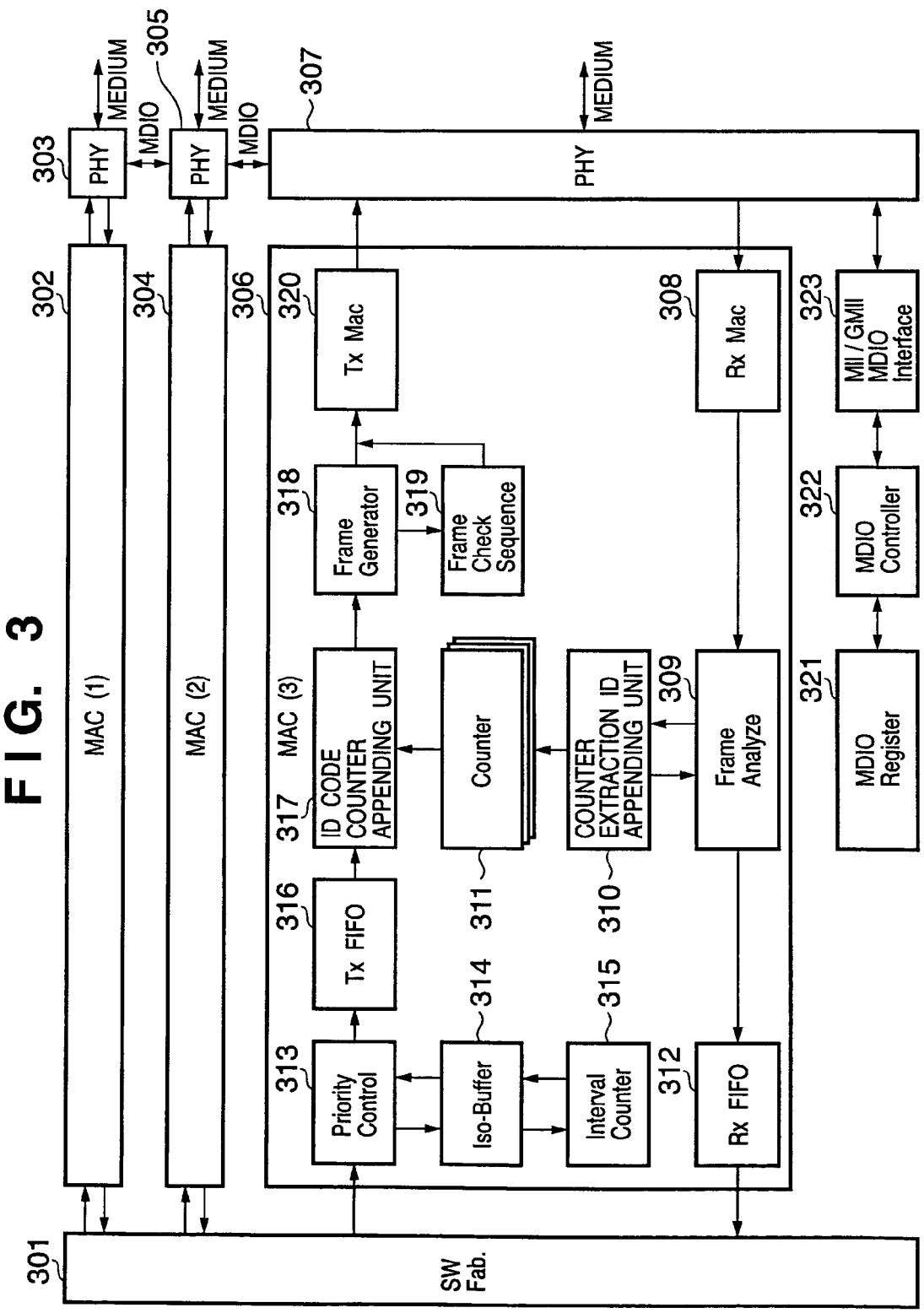
FIG. 3 is a block diagram showing the schematic arrangement of an transmission source (switching device) on the network.

FIG. 3 is a block diagram showing the schematic arrangement of the switching devices 206 to 210. Referring to FIG. 3, a switching device 301 exchanges an Ethernet®-Packet. Media access controllers (to be abbreviated as MACs hereinafter) 302, 304, and 306 generate a frame to be transmitted/received in an Ethernet®-Packet and analyze it. Physical layer devices (to be abbreviated as PHYs hereinafter) 303, 305, and 307 convert a transmitted/received frame into an electrical signal or optical signal.

Control interfaces called MDIOs are provided between the PHYs 303, 305, and 307. An MDIO Register 321, MDIO Controller 322, and MII/GMII MDIO Interface 323 are provided in correspondence with each of the PHYs 303, 305, and 307. The PHYs 303, 305, and 307 are controlled through the corresponding MDIO Registers 321, MDIO Controllers 322, and MII/GMII MDIO Interfaces 323.

Each of the MACs 302, 304, and 306 includes a receiving system and a transmitting system. The receiving system mainly executes frame analysis. The transmitting system mainly executes frame generation. Each of the MACs 302, 304, and 306 has a Counter extraction ID appending unit 310, Counter group 311, and ID code Counter appending unit 317 which execute processing related to a Counter value to provide for time when an iso-frame having a Counter extension Tag indicated by 601 in FIG. 6 is received. The arrangement and operation of the MACs 302, 304, and 306 will be described later in detail.

Figure 4:
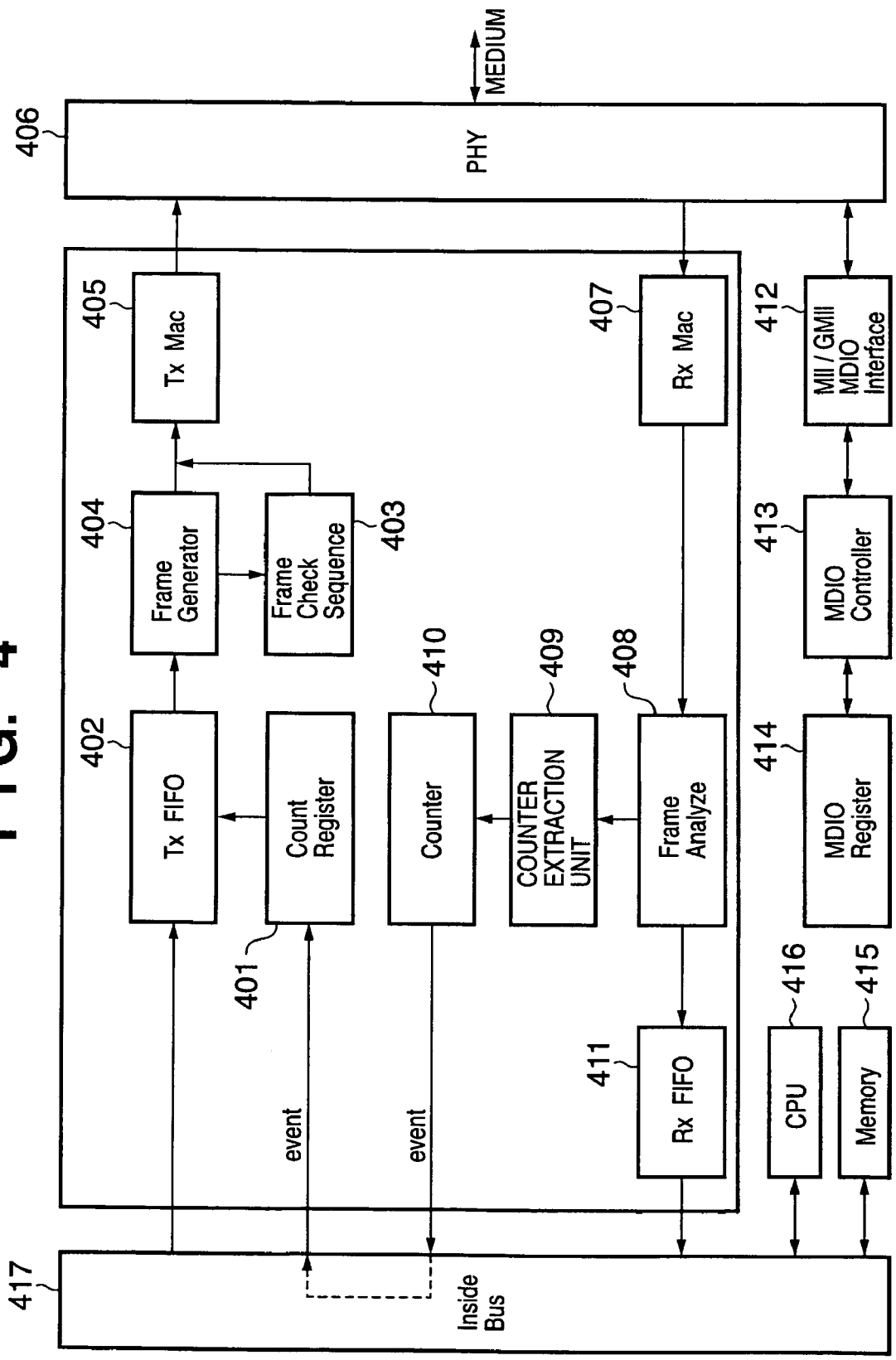
FIG. 4 is a block diagram showing the arrangement of the network interface unit of a station (iso-server, data server, or terminal) on the network.

FIG. 4 is a block diagram showing the arrangement of the network interface unit of the iso-server 201, terminals 202 and 203, and data servers 204 and 205 each serving as a station.

In the arrangement shown in FIG. 4, in the data servers 204 and 205, when a transmission event occurs, transmission data is temporarily stored in a Tx FIFO (transmission buffer) 402 and transferred to a Frame Generator 404 on the basis of a count time by a Count Register 401. The Frame Generator 404 generates a transmission frame on the basis of the transmission data. A Frame Check Sequence unit 403 adds an error detecting code to the transmission frame. Then, the transmission frame is output to a MEDIUM (transmission path) through a Tx Mac 405 and transmission PHY 406.

On the receiving side, a frame received by the PHY 406 is input through an Rx Mac 407. A frame analyzing unit 408 analyzes the frame. The frame main body is input to an Inside Bus 417 through an Rx FIFO 411. The frame is stored in a memory 415 in accordance with an instruction from a CPU 416.

When a Counter extension Tag is detected upon frame analysis by the frame analyzing unit 408, the counter value is extracted by a Counter extraction unit 409. A Counter 410 measures time by decrementing the extracted counter value. The iso-frame is transmitted when the counter value becomes "0", i.e., at a timing desired by the iso-server 201.

Before an explanation of the frame structure of an iso-frame unique to the embodiment, a frame structure defined by IEEE will be described on the basis of FIG. 5.

Reference numeral 501 denotes a frame structure defined by IEEE802.3. The first field of this frame is a header used for a physical layer called a preamble, in which 64 bits of "1" and "0" data are alternated to indicate the start of the frame (the final two bits are "11"). A 48-bit Source Address field indicating the address of the transmission source and a 48-bit Destination Address field indicating the destination address follow the preamble.

In an Ethernet® frame, a Type/Length field is provided next. The Type/Length field stores information of the type or length of the payload. When a value equal to or more than 0x600 (hexadecimal) is stored in the Type/Length field, it is recognized as a Type field. When, e.g., IP is used for the upper layer, 0x800 (hexadecimal) is stored.

Figure 5:
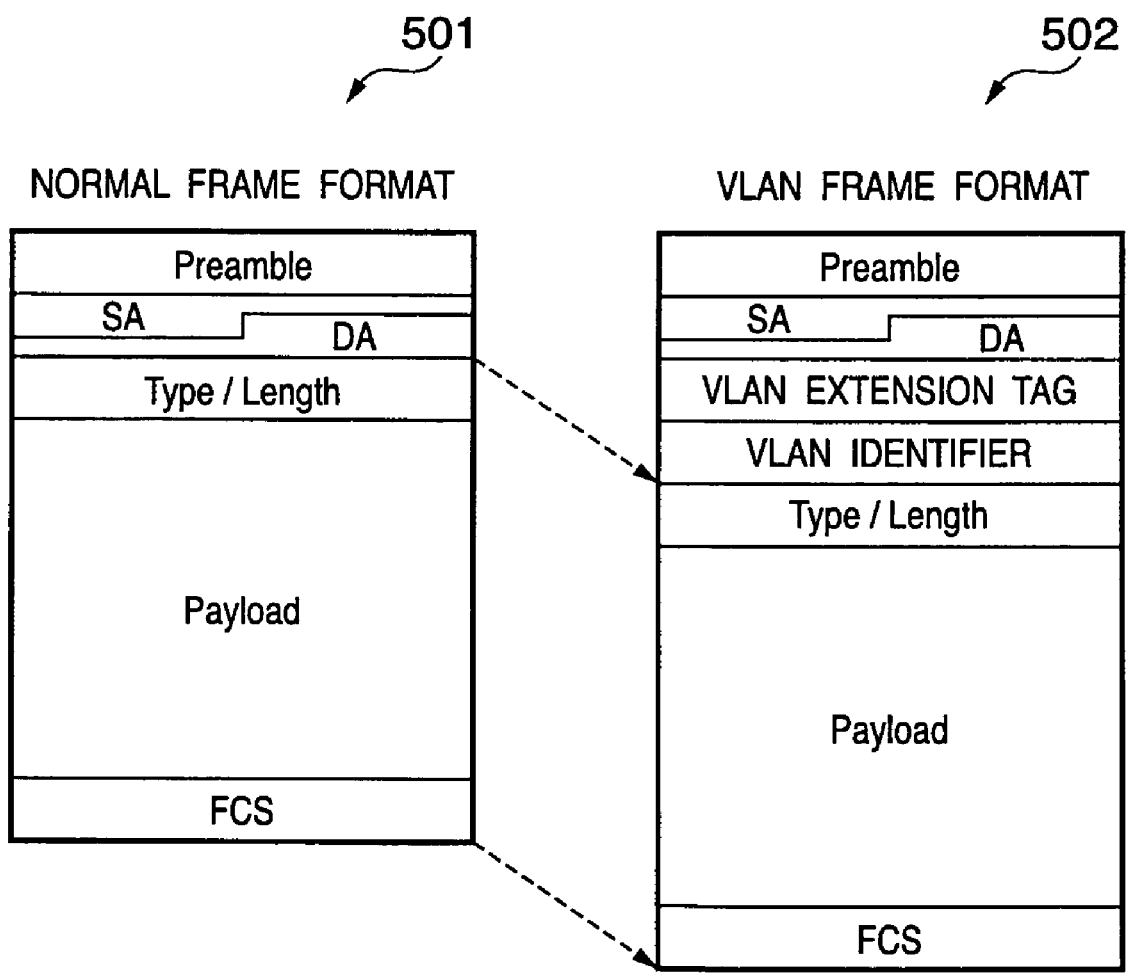
FIG. 5 is a view showing the standard frame format of layer 2 of a packet.

In VLAN (IEEE standard 802.1Q) indicated by 502 in FIG. 5, 0x8100 ((hexadecimal) is stored in the Type/Length field. The Type/Length field with 0x8100 being set indicates that VLAN tag control information is stored in the following two bytes. A payload and FCD (Frame Check Sequence) are provided next. The Type/Length field is managed by the IEEE802 Committee in U.S.A. The Type field used publicly can be known on Internet <http://standards.ieee.org/regauth/ethertype/type-pub.html>

In the iso-frame according to this embodiment, the Type/Length field is recognized not as a Length field but as a Type field. In addition, values except defied field values are used as a Counter extension Tag. That is, in the iso-frame according to this embodiment, an identifiable Tag like a VLAN extension tag is used as a Counter extension Tag. A Counter value is described next to the extension Tag.

When a conventional switching device receives a frame with a Counter extension Tag, the frame is neglected because the field is undefined. The switching devices 206 to 210 according to this embodiment detect both the Counter extension Tag and the Counter value following it in correspondence with the Counter extension Tag.

Figure 7A:
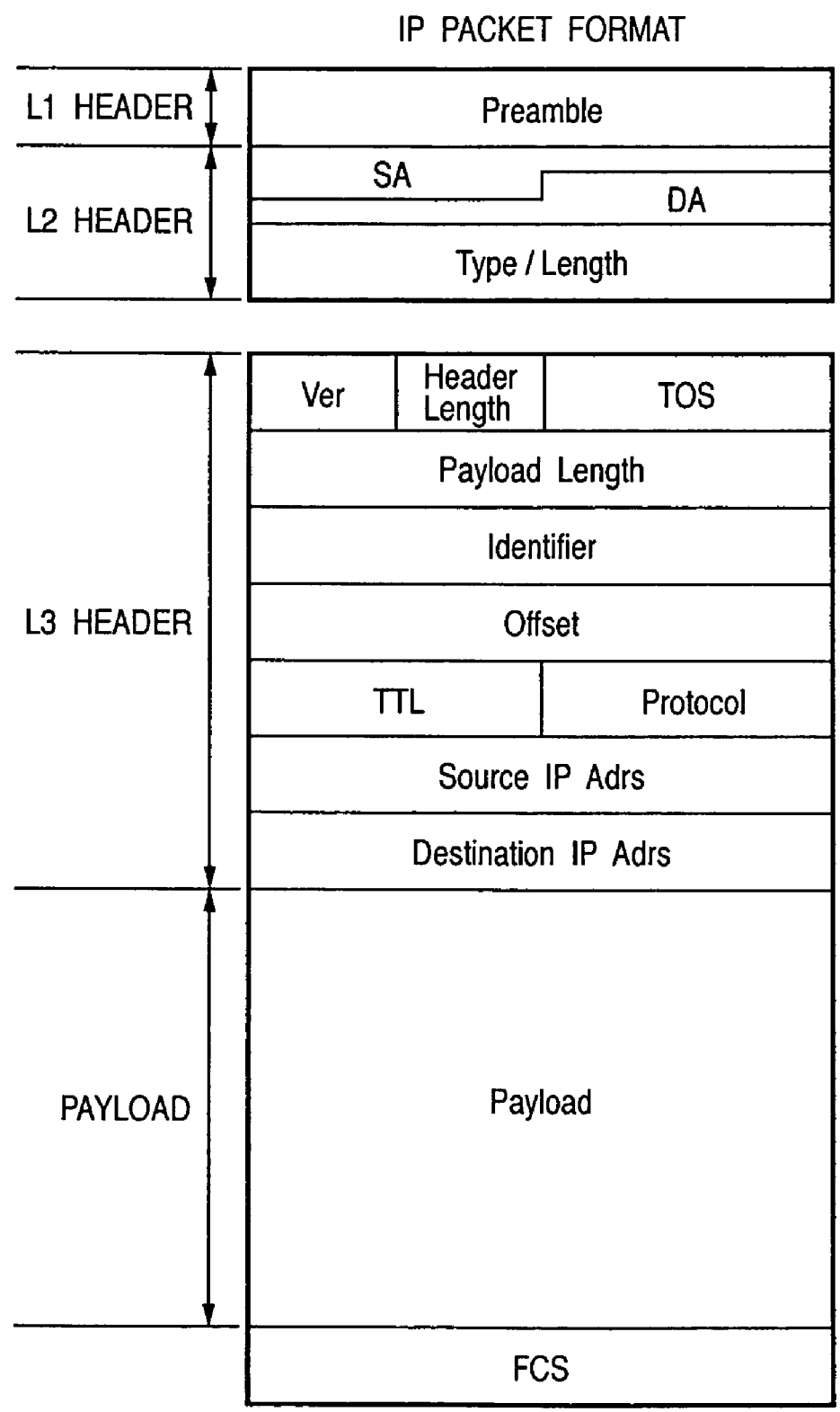
FIG. 7A is a view showing the packet format of layer 3 of an iso-packet used in the embodiment of the present invention.
Figure 7B:
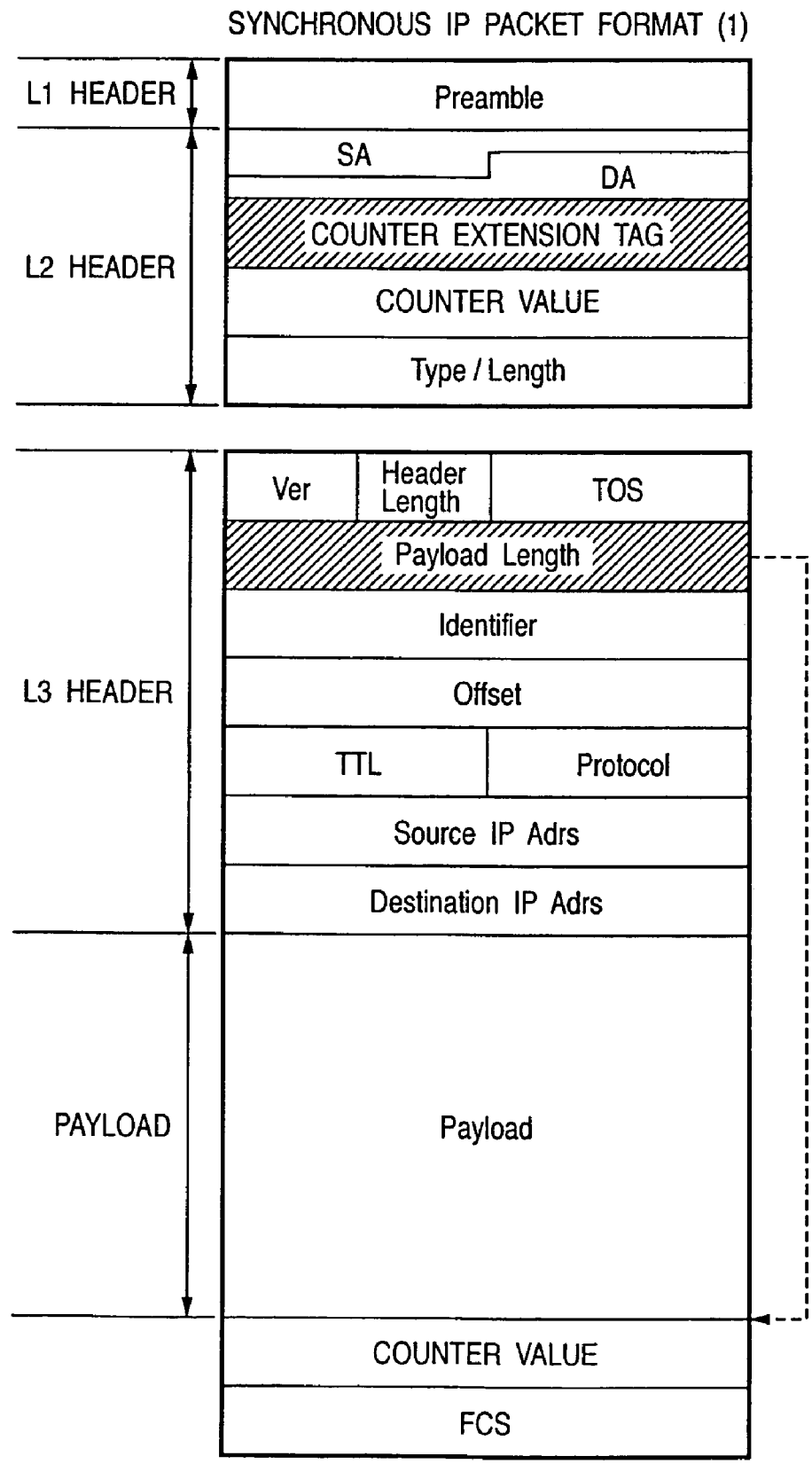
FIG. 7B is a view showing the frame format of layer 3 of the iso-packet used in the embodiment of the present invention.
Figure 7C:
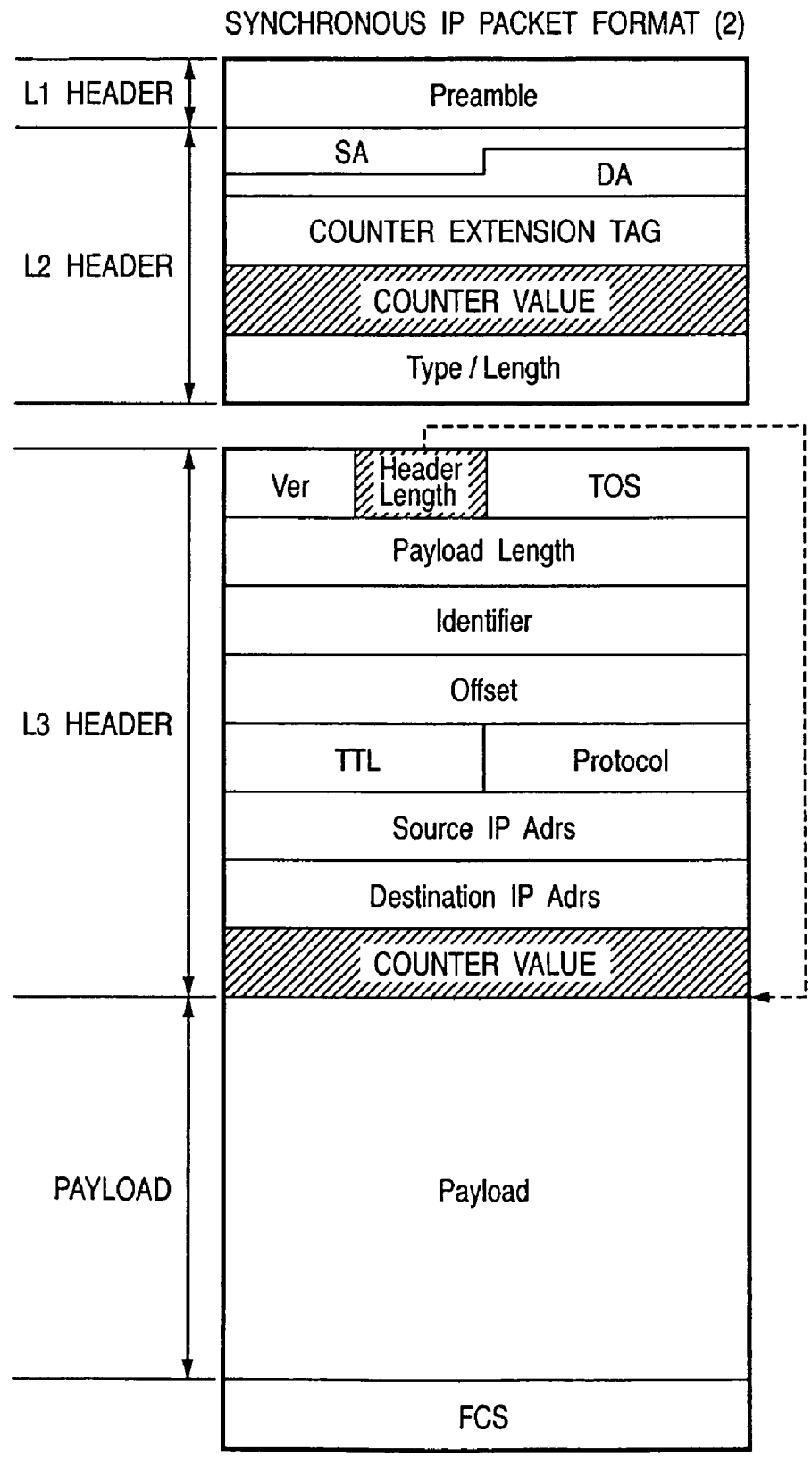
FIG. 7C is a view showing the frame format of layer 3 of an iso-packet used in the embodiment of the present invention.
Figure 9:
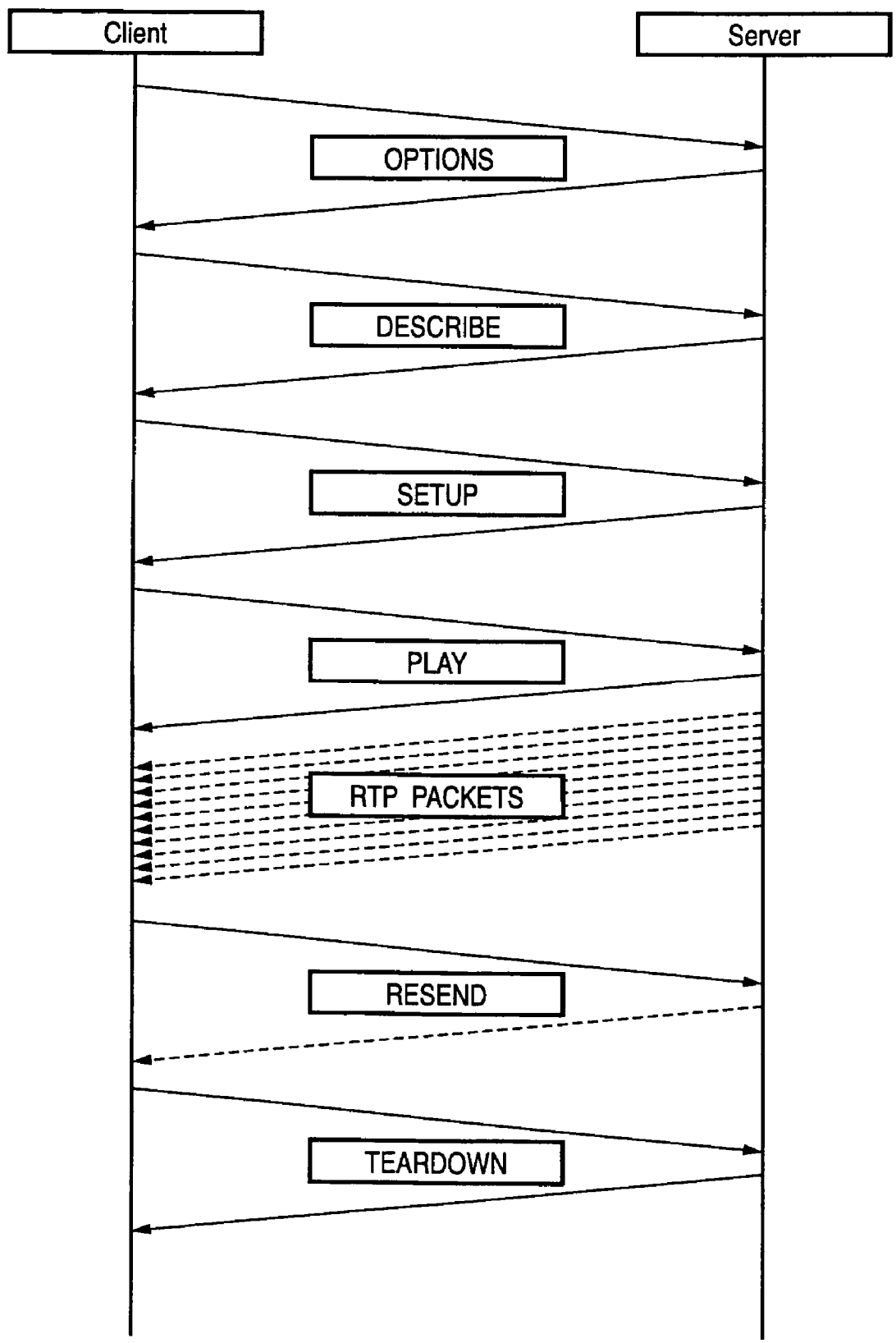
FIG. 9 is a sequence chart of conventional RTP/RTCP.
Figure 10:
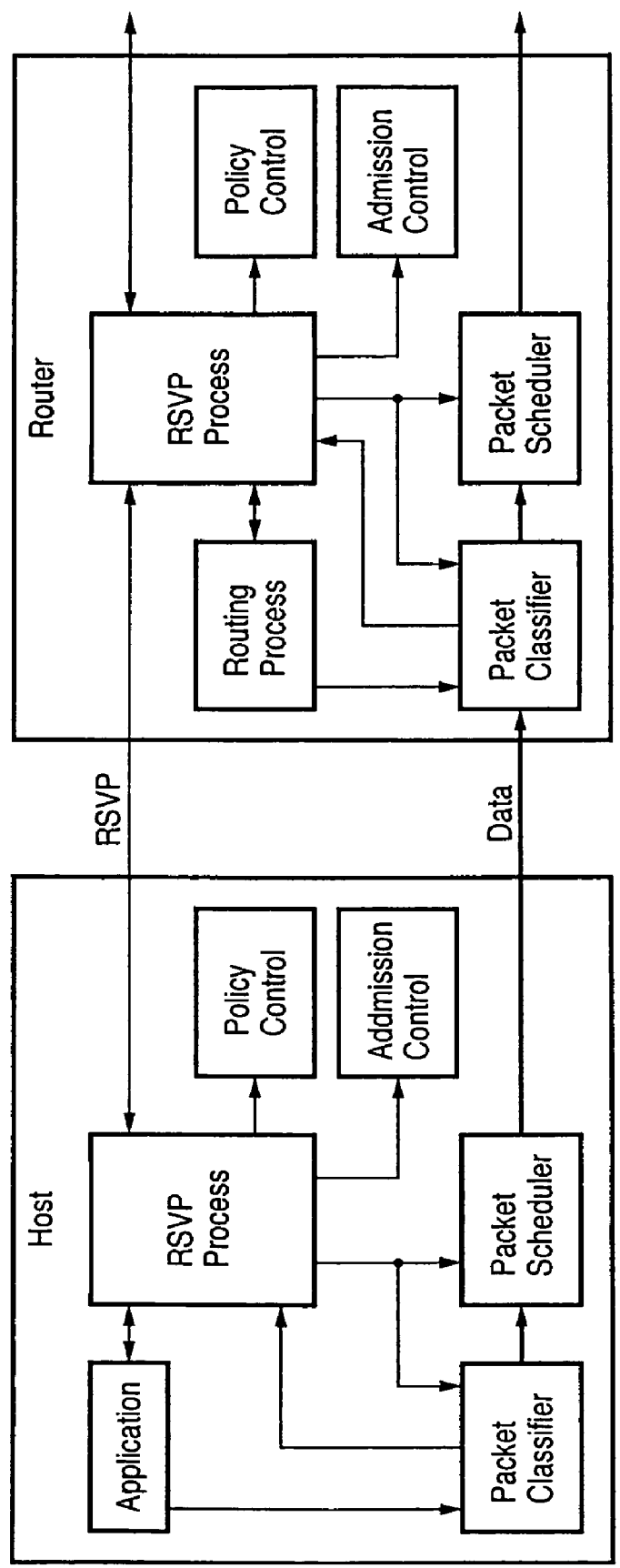
FIG. 10 is a view showing the arrangement of a host and a router so as to explain band reservation by the conventional RSVP.

FIG. 7A shows the format of a conventional packet including an IP layer. The IP header of the IP layer is described at the start of layer 3 following the preamble of layer 1 and the MAC header of layer 2. FIGS. 7B and 7C show the synchronization IP packet formats of an iso-packet available to described the Counter value unique to this embodiment.

Referring to FIGS. 7B and 7C, in the header of the MAC layer of layer 2, both the Counter extension Tag and Counter value are appended, and the Type/Length field follows them. The header of the IP layer of layer 3 also stores the same Counter extension Tag and Counter value. More specifically, in the synchronization IP packet format shown in FIG. 7B, the IP header of layer 3 stores the Counter value next to the data of the payload length. In the example shown in FIG. 7C, the header length is extended, and the Counter value is stored as an IP header option.

In the arrangement shown in FIG. 4, the iso-server 201 stores, in the Tx FIFO 402, the Destination Address and the data in the Type/Length field of the header of the iso-frame. When an iso-frame transmission event occurs at a predetermined time interval, the frame generator 404 inserts a unique Counter extension Tag as indicated by 601 in FIG. 6 and adds the Counter value. The Counter value has a given time unit and designates the execution timing of an arbitrary process for a station to send the iso-packet.

The frame check sequence unit 403 calculates CRC32 as an error detecting code throughout the frame and adds the calculated value to the end of the frame. In this way, the sending frame of the iso-frame is created and transferred from the Tx Mac 405 to the PHY 406. After physical layer header information such as a Preamble is added, the frame is output to the transmission path.

In the network configuration shown in FIG. 2, the iso-frame sent from the iso-server 201 is received by the switching device 206. In the arrangement example shown in FIG. 3, the PHYs 303, 305, and 307 serving as physical layer blocks remove the Preamble as the physical layer header information from the frame information received by each of the switching devices 206 to 210. The frame is transferred to a Tx FIFO 308, analyzed by a frame analyzing unit 309 on the basis of the Type/Length information, and temporarily stored in a reception FIFO 312.

If it is found as a result of frame analysis by the frame analyzing unit 309 that a Counter extension Tag is added, the Counter extraction ID appending unit 310 appends an arbitrary ID value. At this time, the Counter value in the frame information is held in a Counter of the Counter group 311, which corresponds to the ID value, and replaced with an ID value corresponding to the holding Counter [602 in FIG. 6].

The frame information temporarily stored in the reception FIFO 312 is switched to the Destination Address by the SW Fabric 301. If the switching destination is a MAC-N, transmission packets are stored in a transmission FIFO 316 in accordance with the priority order determined by a Priority Controller 313. When the transmission packet is a frame with a Counter extension Tag, i.e., iso-frame, the ID code Counter appending unit 317 converts the ID Value into a Counter' value of a counter having an ID that coincides with the ID value and transfers the frame to a frame generator 318 to reconstruct the frame.

In this case, since the Counter value in the iso-frame generated by the frame generator 318 has changed, the FCS (Frame Check Sequence) at the end of the frame must be recalculated. A frame check sequence unit 319 calculates the FCS' and replaces it with the preceding FCS [603 in FIG. 6]. The iso-frame which has undergone replacement to the FCS' is sent to the transmission path through an Rx Mac 320 and the PHYs 303, 305, and 307.

In this case, the Counter group 311 decrements the Counter value at a predetermined time interval, including the time during which the frame is stored in the Tx FIFO 316 or Rx FIFO 312 or the time during which the frame stays in the SW Fab 301. For this reason, the replaced Counter' value reflects the iso-frame transmission delay time generated by switching processing by the switching device. Such replacement processing to the Counter' value is executed in all the switching devices 206 to 210.

In the routers 211 and 212, processing of reflecting the iso-packet transmission delay time on the Counter value of layer 3 is executed, as in the switching devices 206 to 210. More specifically, in the routers 211 and 212, the presence/absence of the Counter extension Tag is detected in the header of layer 2. If the Counter extension Tag is detected, the necessary time for routing is calculated. The iso-packet is output after the Counter value at the time of iso-packet transmission to the routers 211 and 212 is decremented by a value corresponding to the necessary time.

Hence, when the iso-packet arrives at the data server 204 or 205, the Counter value that was initially set by the iso-server 201 has been decremented by a value corresponding to the sum of transmission delay times for processing in the switching devices and routers (intermediate devices) which the iso-packet has passed through.

To transmit the iso-packet to the data server 205 through the routers 211 and 212, the iso-server 201 uses the IP packet format shown in FIG. 7B or 7C. Hence, the routers 211 and 212 decrement the Counter value in the IP packet format shown in FIG. 7B or 7C by a value corresponding to the necessary routing time.

Upon receiving the iso-packet having the Counter value (to be referred to as a remaining Counter value hereinafter) on which the transmission delay time for processing in each intermediate device, the data server 204 or 205 with the arrangement shown in FIG. 4 causes the PHY 406 to remove the Preamble of the physical layer header. The iso-packet is transferred to the frame analyzing unit 408 through the Rx Mac 407. The payload portion is temporarily stored in the Rx FIFO 411 and stored in the memory 415 through the Inside Bus 417 in accordance with an instruction from the CPU 416.

If it is confirmed by frame analysis by the frame analyzing unit 408 that the received iso-packet or frame has an Ether header or Counter extension IP header with a Counter extension Tag, the Counter extraction unit 409 extracts the remaining Counter value. The remaining Counter value is decremented by the Counter 410 at a predetermined time interval.

When the Counter 410 decrements the remaining Counter value, and the decrement value becomes "0", the Counter 410 notifies the CPU 416 of it. Upon receiving this notification, the CPU 416 activates a desired process such as iso-data packet sending. In this case, the time when the Counter 410 decrements the remaining Counter value, and the decrement value becomes "0" is a time that absorbs the transmission delay time in each intermediate device and coincides with the time when the iso-server 201 activates the desired process.

In other words, even when transmission delay occurs in an intermediate device, the data servers 204 and 205 can transmit an iso-data packet accurately and reliably at a time designed by the iso-server 201 by the iso-packet or iso-frame. Since the iso-server 201 sends the iso-packet to the data servers 204 and 205 at a predetermined time interval, the data servers 204 and 205 can stably send audio or video streaming data.

In the switching devices 206 to 210 and routers 211 and 212 of the arrangement shown in FIG. 3, when a packet with a Counter extension Tag (iso-data packet) is received, and packet exchange is done in the SW Fab 301, the packet is temporarily stored in an Iso-Buffer 314. An Interval Counter 315 is activated, and the time interval until the next iso-data packet input is measured.

Figure 1:
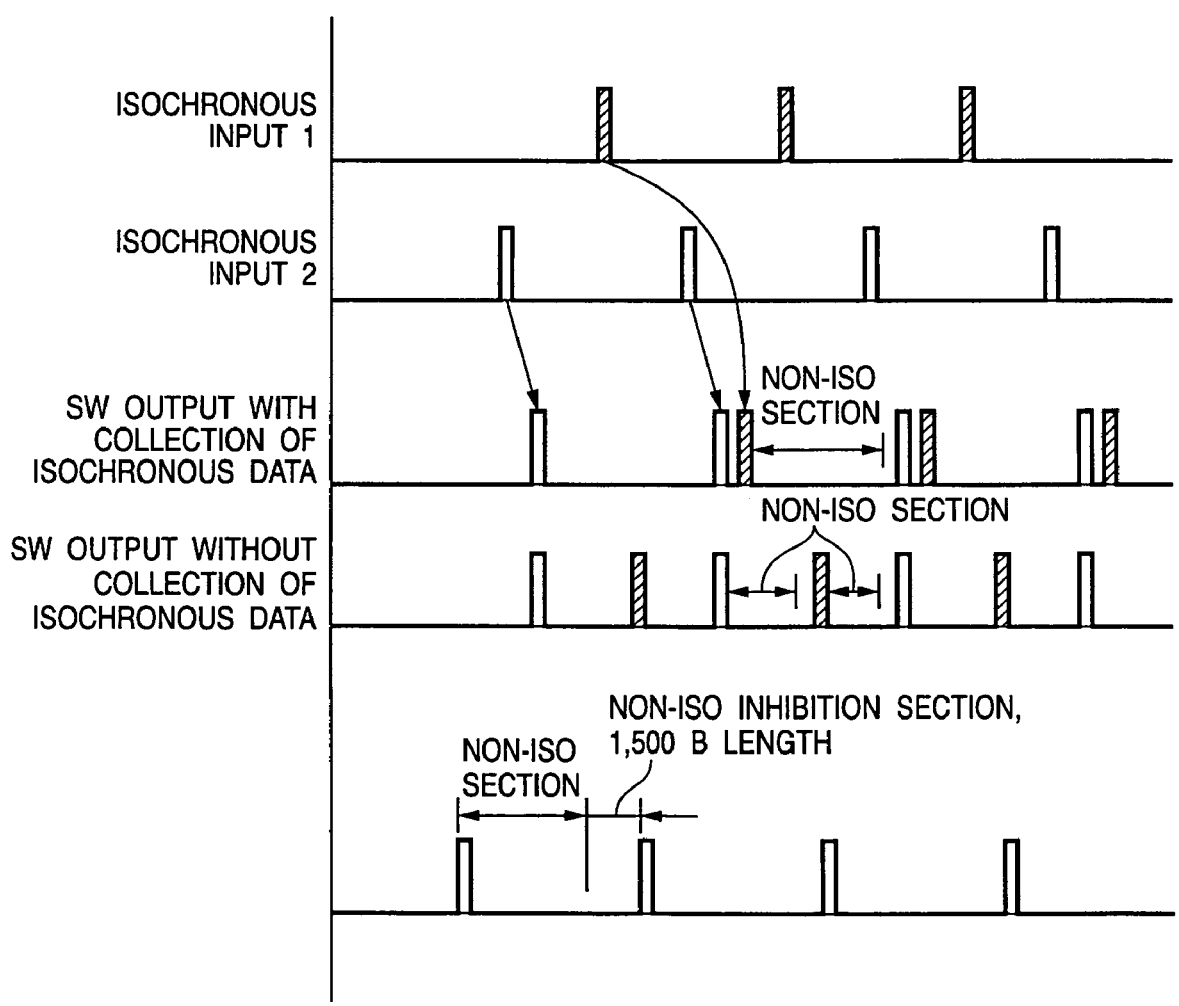
FIG. 1 is a timing chart showing isochronous packet transmission processing in an intermediate device according to an embodiment of the present invention.

The Priority Controller 313 predicts the time of the next iso-data packet input on the basis of the measured time interval. Iso-data packets conflict in the intermediate device is avoided by setting a section going back from the predicted time to a time corresponding to 1,500 bytes, i.e., the maximum packet length of a non-iso-data packet to a non-iso-inhibition section and inhibiting output of a normal non-iso-packet (the lowermost portion of FIG. 1).

However, for example, an iso-data packet sent from the data server 204 to the terminal 202 and an iso-data packet sent from the data server 205 to the terminal 203 in FIG. 2 are multiplexed in the transmission path between the switching devices 208 and 209. If an iso-data packet is output from the switching device 208 to the switching device 209 without control, the period when non-iso-data packet output is inhibited becomes long, as indicated by "SW output without collection of isochronous data" in FIG. 1.

In this embodiment, the switching device 208 causes the Interval Counter 315 to measure the output interval of iso-data packets from the switching device 207. An iso-data packet precedingly issued from the switching device 207 is temporarily stored in the Iso-Buffer 314. When the next iso-data packet issued from the switching device 207 arrives, the switching device 208 outputs the iso-data packet issued precedingly and then the iso-data packet issued next ("SW output with collection of isochronous data" in FIG. 1).

As described above, when a normal non-iso-data packet and iso-data packet are clearly time-divisionally output, the period when non-iso-data packet output is inhibited is shortened even in a transmission path with iso-data packet streams being multiplexed, and the transmission path can efficiently be used.

The present invention is not limited to the above-described embodiment. For example, the count processing of the Counter value in the intermediate device or data server can be done not by decrement but by increment. The same output processing as in the switching device 208 can also be done by another switching device or router in accordance with the network configuration.

As described above, according to the present invention, a transmission system and control method capable of reliably transmitting a plurality of real-time data can be provided.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-099543, filed Mar. 30, 2005, which is hereby incorporated by reference herein in its entirely.

What is claimed is:

1. A transmission system having a synchronization control server which supplies, to a plurality of data output servers at a predetermined time interval, synchronization control packets to designate a transmission timing in transmitting isochronous data packets, and a plurality of intermediate devices which mediate transmission of the isochronous data packets and the synchronization control packets, wherein at least one of the intermediate devices comprises:
　a receiving unit which receives isochronous data packets that are transmitted by a first data output server toward a first destination terminal and isochronous data packets that are transmitted by a second data output server toward a second destination terminal;
　a buffer which temporarily stores the received isochronous data packets;
　a determination unit which determines to send the isochronous data packets, at the predetermined time interval, that originate from the first and the second data output servers in a transmission path of said isochronous data packets; and
　an output unit which outputs the isochronous data packets and non-isochronous data packets in the transmission path;
　wherein said output unit inhibits output of the non-isochronous data packets in a section going back from an output time of the isochronous data packets to a time corresponding to the maximum length of the non-isochronous data packets, and
　wherein said output unit outputs with collection of the isochronous data packets, which originate from the first and second data output servers and are temporarily stored at the buffer, to next intermediate device of the transmission path when said determination unit determines to send the isochronous data packets that originate from the first and the second data output servers in the transmission path of said isochronous data packets so that the period when non-isochronous data packets output is inhibited is shortened.

2. The system according to claim 1, wherein the synchronization control server sets, in the synchronization control packets, a counter value to designate the transmission timing.

3. The system according to claim 2, wherein the at least one intermediate device updates the counter value in accordance with a time required for mediating processing in the intermediate device, in mediating the synchronization control packets supplied from the synchronization control server to the data output server.

4. The system according to claim 2, wherein the data output servers transmit a desired isochronous data packet to a desired terminal device when the counter value in the synchronization control packet, which is updated by the at least one intermediate device, is completely counted.

5. An intermediate device in a transmission system including a synchronization control server which supplies, to a plurality of data output servers at a predetermined time interval, synchronization control packets to designate a transmission timing for transmitting isochronous data packets, the intermediate device mediating transmission of the isochronous data packets and the synchronization control packets, comprising:
a receiving unit which receives isochronous data packets that are transmitted by a first data output server toward a first destination terminal and isochronous data packets that are transmitted by a second data output server toward a second destination terminal;
a buffer which temporarily stores the received isochronous data packets;
a determination unit which determines to send the isochronous data packets, at the predetermined time interval, that originate from the first and the second data output servers in a transmission path of said isochronous data packets; and
an output unit which outputs the isochronous data packets and non-isochronous data packets in the transmission path,
wherein said output unit inhibits output of the non-isochronous data packets in a section going back from an output time of the isochronous data packets to a time corresponding to the maximum length of the non-isochronous data packets, and
wherein said output unit outputs with collection of the isochronous data packets, which originate from the first and second data output servers and are temporarily stored at the buffer to next intermediate device of the transmission path when said determination unit determines to send the isochronous data packets that originate from the first and the second data output servers in the transmission path of said isochronous data packets, so that the period when non-isochronous data packets output is inhibited is shortened.

6. The intermediate device according to claim 5, wherein the synchronization control server sets, in the synchronization control packets, a counter value to designate the transmission timing, and
the intermediate device further comprises an update unit which updates the counter value in accordance with a time required for mediating processing in the intermediate device in mediating the synchronization control packets supplied from the synchronization control server to the data output servers.

7. A transmission method of a transmission system having a synchronization control server which supplies, to a plurality of data output servers at a predetermined time interval, synchronization control packets to designate a transmission timing for transmitting isochronous data packets, and intermediate devices which mediate transmission of the isochronous data packets and the synchronization control packets, comprising:
in at least one of the intermediate devices:
receiving isochronous data packets that are transmitted by a first data output server toward a first destination terminal and isochronous data packets that are transmitted by a second data output server toward a second destination terminal;
temporarily storing the received isochronous data packets in a buffer;
determining to send the isochronous data packets, at the predetermined time interval, that originate from the first and the second data output servers in a transmission path of said isochronous data packets; and
outputting the isochronous data packets and non-isochronous data packets in the transmission path,
wherein the at least one intermediate device inhibits output of the non-isochronous data packets in a section going back from an output time of the isochronous data packets to a time corresponding to the maximum length of the non-isochronous data packets, and
wherein said at least on intermediate device outputs with collection of the isochronous data packets, which originate from the first and the second data output servers and are temporarily stored in the buffer, to next intermediate device of the transmission path when said at least one intermediate device determines to send the isochronous data packets that originate from the first and second data output servers in the transmission path of said isochronous data packets, so that the period when non-isochronous data packets output is inhibited is shortened.

* * * * *